UNITED STATES PATENT OFFICE.

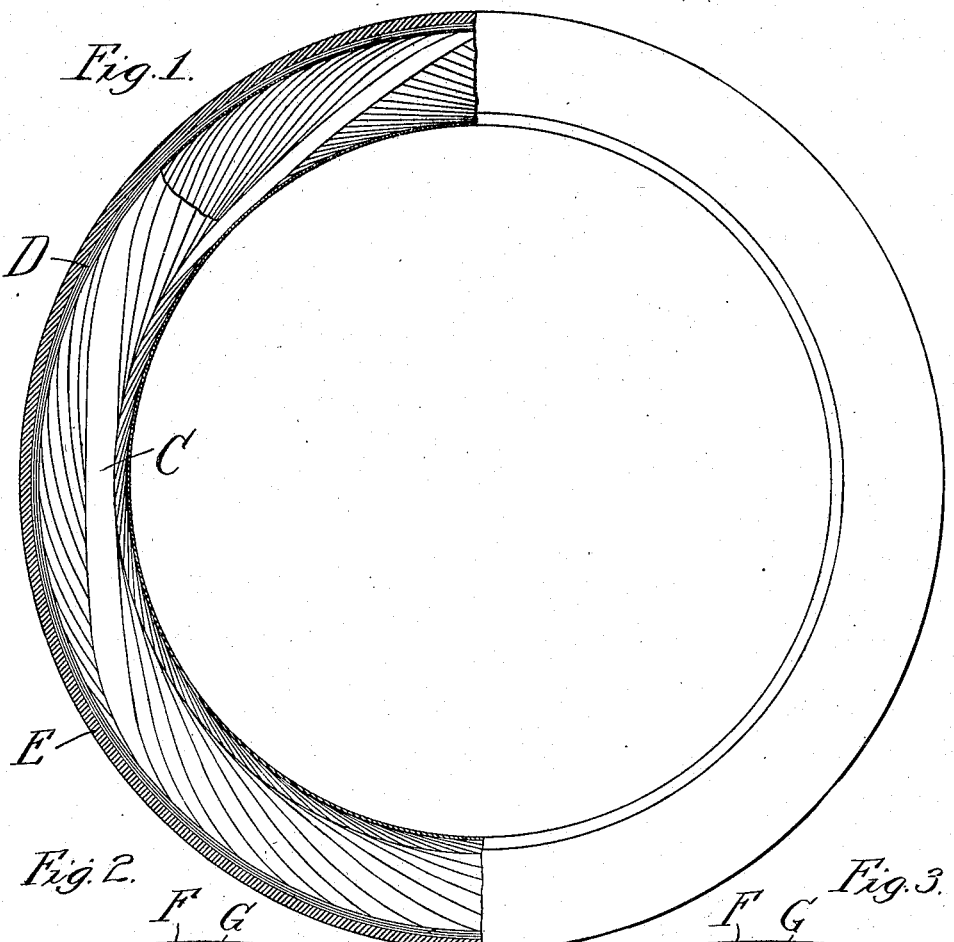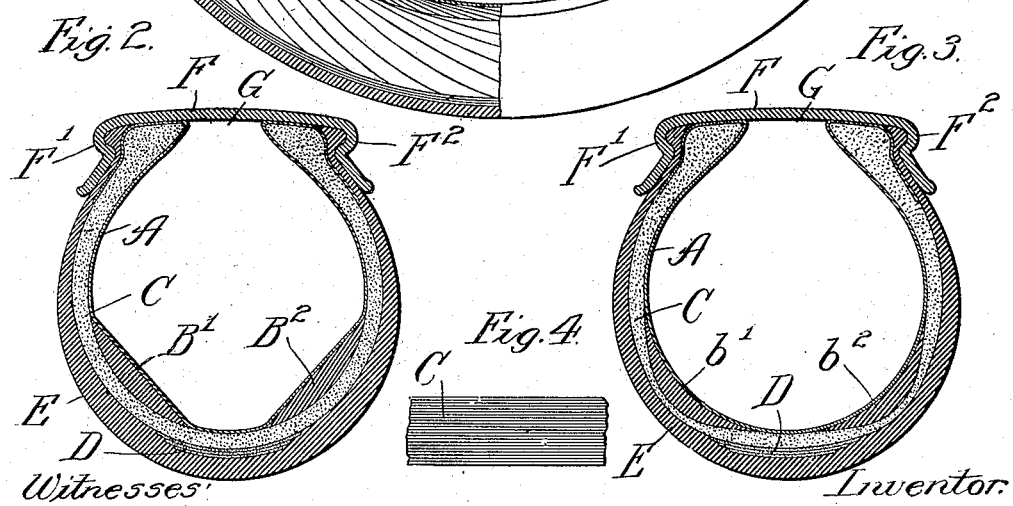

JOHN F. PALMER, OF CHICAGO, ILLINOIS.

TIRE-CASING.

No. 924,186.

Specification of Letters Patent.

Patented June 8, 1909.

Application filed October 14, 1907. Serial No. 397,373.

*To all whom it may concern:*

Be it known that I, JOHN F. PALMER, a citizen of the United States, residing at Chicago, in the county of Cook and State of Illinois, have invented certain new and useful Improvements in Tire-Casings, of which the following is a specification.

My invention relates in general to pneumatic tires, and more particularly to an improved tire casing.

It has been found in practice that pneumatic tire casings first break and wear out along parallel longitudinal lines at each side of the tread, owing to the weight of the supported load flattening the tread and thereby forming sharp bends in the casing at each side of the tread. Such sharp bends in the casing tend to crush and wear the strain-resisting fabric, causing the fabric to break along longitudinal lines at each side of the tread, and thereby destroying the casing. The life of a casing is consequently limited to the capacity of the strain-resisting fabric to withstand the wear and tear imposed thereon at each side of the tread.

The primary object of my invention is to provide a tire casing in which the strain-resisting fabric will not be bent at sharp angles at each side of the tread, and will consequently not be broken and crushed.

A further object of my invention is to provide a casing which will be simple in construction and at the same time will possess maximum efficiency and durability.

My invention will be more fully described hereinafter with reference to the accompanying drawing, in which the same is illustrated as embodied in a convenient and practical form, and in which—

Figure 1 shows a tire casing partially in side elevation and partially in section; Fig. 2, a cross section on an enlarged scale through my improved casing and a rim on which it is supported; Fig. 3, a view similar to Fig. 2, showing a modified form of my invention; and Fig. 4, a detail view of a portion of the band which constitutes the strain-resisting fabric.

The same reference characters are used to designate the same parts in the several figures of the drawings.

Reference letter A indicates the inner skin of the tire casing, which may be made of any suitable material, as, for instance, stockinet frictioned on one surface or in lieu of stockinet, rubber or canvas may be employed, or the inner skin may be entirely omitted.

Reference letter C indicates the strain-resisting fabric which is necessarily employed in tire casings, in order that they may be capable of resisting the strains to which they are subjected in use. The strain-resisting fabric may consist of canvas, but, preferably, I employ a strain-resisting fabric consisting of a band composed of a plurality of parallel threads, such band being wrapped upon the mandrel upon which the tire casing is formed so as to form chords connected at their ends to points on the tread and intermediate of their ends located tangential to the inner edge of the casing.

A tire casing having a strain resisting fabric composed of a band consisting of parallel strands, forms the subject-matter of copending applications filed by me and, therefore, does not in itself constitute my present invention.

Reference letter D indicates a longitudinally wound band or bands extending around the tread of the casing and serving to connect and unify the underlying tangentially wound bands forming the strain-resisting fabric C.

E designates the usual outer coating o rubber, which is applied around the strain-resisting fabric and is then vulcanized.

In order to prevent the strain-resisting fabric C from being sharply bent along longitudinal lines at the opposite sides of the tread, I provide cushions $B'$ and $B^2$ located within the strain-resisting fabric and serving as supports around which the fabric extends. The resilient cushions $B'$ and $B^2$, preferably, consist of strips of rubber which are laid upon the inner skin A in constructing the tire and upon which the strain-resisting fabric is wound. The cushion strips $B'$ and $B^2$ prevent the casing from being bent sharply at each side of the flattened tread portion, and consequently prevent such sharp bends in the strain-resisting fabric as would tend to crush and break the threads of such fabric.

While my improvement may be embodied in a tire casing, the strain-resisting fabric of which is canvas, yet it is particularly advantageous when applied to a tire casing, the strain-resisting fabric in which is composed of bands of parallel strands, as the strands are more liable to be broken and crushed at each side of the tread than are the threads of a canvas fabric.

The cushioning strips B', B² may be located, as shown in Fig. 2, so as to project within the usual circular cross section of a tire casing, or, if desired, such cushioning strips may be located as shown in Fig. 3. In this figure reference characters b', b² indicate the elastic cushions which are so located as to permit the tire casing to have a substantially circular internal cross section. In the modified form of my invention shown in Fig. 3, the strain-resisting fabric is so embedded in the casing as to lie nearer the outer surface thereof at each side of the tread, thereby permitting the location of the longitudinal cushions within the strain resisting fabric without obstructing the circular internal cross section of the opening in the tire casing.

Reference letter F indicates a rim provided with side flanges F' and F², upon which the tire casing is supported.

It will, of course, be understood that my invention may be embodied in other forms of tire casings than those herein illustrated, and also that a tire casing embodying my invention may be supported upon any suitable construction of rim.

From the foregoing description, it will be observed that I have invented an improved tire casing, the strain resisting fabric of which will not be sharply bent at each side of the tread and will, therefore, not be subjected to crushing and breaking strains. My improvement, therefore, increases the durability of a tire casing, by strengthening it where it would otherwise be first broken.

What I claim is:

1. In a tire casing, the combination with an outer covering, a strain-resisting fabric embedded in the casing, and a non-metallic resilient cushion located between the strain-resisting fabric and the air tube to support the strain-resisting fabric and minimize the bends therein.

2. In a tire casing, the combination with an outer covering, a strain-resisting fabric, and longitudinal non-metallic flexible supports located at each side of the tread adhering to the strain-resisting fabric and located between the strain-resisting fabric and the inner air tube.

3. In a tire casing, the combination with an outer covering, a strain-resisting fabric composed of separate threads embedded in the casing, and longitudinal non-metallic resilient cushions located at each side of the tread upon which said fabric is supported.

JOHN F. PALMER.

Witnesses:
GEO. L. WILKINSON,
ANNA L. SAVOIE.